United States Patent
Browne et al.

(10) Patent No.: US 6,856,316 B1
(45) Date of Patent: Feb. 15, 2005

(54) APPARATUS AND METHOD OF VARYING FONT PARAMETERS

(75) Inventors: Cameron Bolitho Browne, Burleigh Heads Queensland (AU); Paul Quentin Scott, Pymble New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/394,282

(22) Filed: Sep. 10, 1999

(30) Foreign Application Priority Data

Sep. 30, 1998 (AU) .............................................. PP6256

(51) Int. Cl.⁷ .............................................. G06T 11/00
(52) U.S. Cl. .................................................... 345/467
(58) Field of Search .................... 345/144, 467, 345/468, 469, 470, 471, 472, 472.1, 472.2, 660, 947, 948; 358/1.11, FOR 151; 707/529, 542

(56) References Cited

U.S. PATENT DOCUMENTS 5,167,013 A    11/1992  Hube et al. .................. 395/110
5,586,241 A  * 12/1996  Bauermeister et al. ...... 395/167

FOREIGN PATENT DOCUMENTS

EP    0 478 357 A2    4/1992
WO    WO 92/06434    4/1992

OTHER PUBLICATIONS

Bill Camarda, Using Microsoft Word 97, 1997, QUE, Special Edition, p. 49.*

Paul Gilster, The SLIP/PPP Connection, !1995, John Wiley & Sons, Inc., pp. 225,232,234, and 374.*

Sims, K., "Artificial Evolution for Computer Graphics", Computer Graphics, vol. 25, No. 4, Jul. 1991, pp. 319–328.

* cited by examiner

*Primary Examiner*—Matthew C. Bella
*Assistant Examiner*—G. F. Cunningham
(74) *Attorney, Agent, or Firm*—Fitzpatrick, Cella, Harper & Scinto

(57) ABSTRACT

The present invention discloses a user interface system which enables the parameters (eg character infilling, character color, character opacity, color saturation, etc) of a character font (or other image) to be selected in sequence. Of the maximum possible combination of selectable sequences, some are disabled in order to deliberately simplify the choice available to the user. The disablement is preferably selectively activatable to assist first time and new users but not inhibit experienced users. The characters (FIGS. 1 and 2) are able to be generated on a conventional general purpose computer (100). The interface system is vendible as a computer program product.

25 Claims, 3 Drawing Sheets

APPARATUS AND METHOD OF VARYING FONT PARAMETERS

FIELD OF THE INVENTION

The present invention relates to fonts and, in particular, to a user interface by means of which various parameters can be entered or modified so that a user can select and customise a particular font which appeals to the user. The present invention also relates to a font selection system, a method and a computer program product.

1. Background Art

As graphical computer systems have become more complicated, the range of fonts and the range of graphical effects available to users has steadily increased. However, increasing choice does not necessarily represent increasing convenience since the user is presented with an often bewildering number of choices. Thus an increased time is required in evaluating the possibilities before finally selecting a choice.

2. Disclosure of the Invention

The object of the present invention is to provide the user with a convenient means of making a rapid selection.

In accordance with one aspect of the present invention there is disclosed a user interface system to allow a user to select sequential parameters in a selectable font system, said system comprising n possible selectable fonts, n being a positive integer, and disablement means to disable the selection of m of said fonts, m being a positive integer less than n.

In accordance with another aspect of the present invention there is disclosed a method of allowing a user to select sequential parameters in a selectable font system, said method comprising the steps of determining that some of the possible selectable sequences do not comply with a subjective criterion, and disabling the selection of said some possible selectable sequences.

In accordance with a still further aspect of the present invention there is disclosed a computer program product to allow a user to select sequential parameters in a selectable font system, said product comprising disablement means to disable some of the possible selectable sequences, said disabled sequences not complying with a subjective criterion.

Furthermore, a font resulting from any of the above is also disclosed.

BRIEF DESCRIPTION OF THE DRAWINGS

An embodiment of the present invention will now be described with reference to the drawings in which.

DETAILED DESCRIPTION INCLUDING BEST MODE

Modern computer systems are intended to allow the user to select from a wide range of fonts, and graphical effects associated with fonts, in order to arrive at a desired selection. In addition to classical fonts such as Times Roman, Helvetia, etc various graphical effects are available such as the infilling of characters with various surfaces, textures, images and the like and other similar graphical effects. This can present the user with a bewildering array of possible selections.

Figure 1:
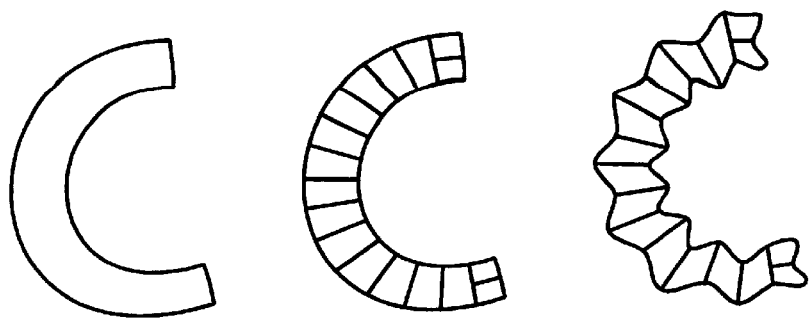
FIG. 1 shows the result of a first font selection.

FIG. 1 represents the outcome of a first possible selection in which the initial selection or determining parameter is the skeleton or outline of the characters to comprise the font. In FIG. 1 only the character C is illustrated. The next choice for the user is one of a number of ways of modifying the basic character C and in the choice illustrated in FIG. 1 the user decides to infill the interior of the character with a series of substantially equally spaced lines which are drawn normal to the outline or exterior of the character. The result is as illustrated in the centre of FIG. 1.

Next the user decides to still further modify the font by applying a sinusoidal perturbation to the exterior of the character so as to produce the right hand character C in FIG. 1.

Figure 2:
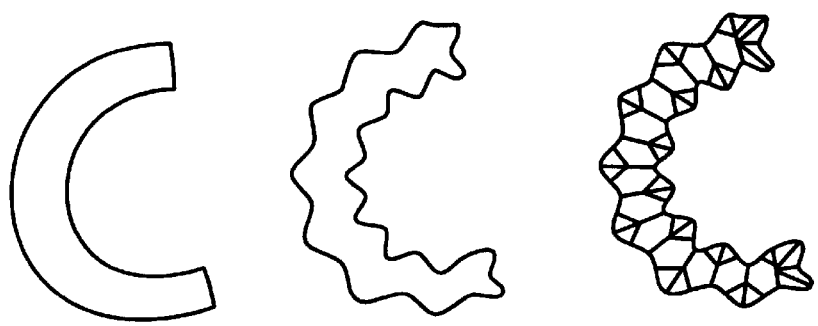
FIG. 2 shows the result of a second font selection.

FIG. 2 illustrates the result of selecting the same parameters but in a different order. In the outcome illustrated in FIG. 2 the same initial character is selected as in FIG. 1, however, the sinusoidal perturbation of the outline of the character is selected as the second parameter, rather than the third as in FIG. 1. Finally, in FIG. 2 the infilling with lines normal to the exterior of the character is now carried out as the third step thereby resulting in a different filling pattern in FIG. 2 from that created in FIG. 1. It will be apparent from FIGS. 1 and 2 that although the same font parameters have been selected, because they have been selected in a different sequence, the resulting font characters are different.

Figure 3:
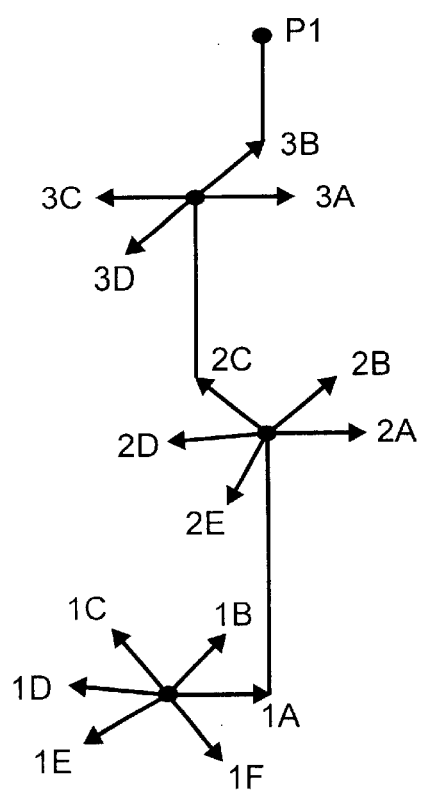
FIGS. 3 and 4 respectively diagrammatically illustrate the font selection of FIGS. 1 and 2 respectively.
Figure 4:
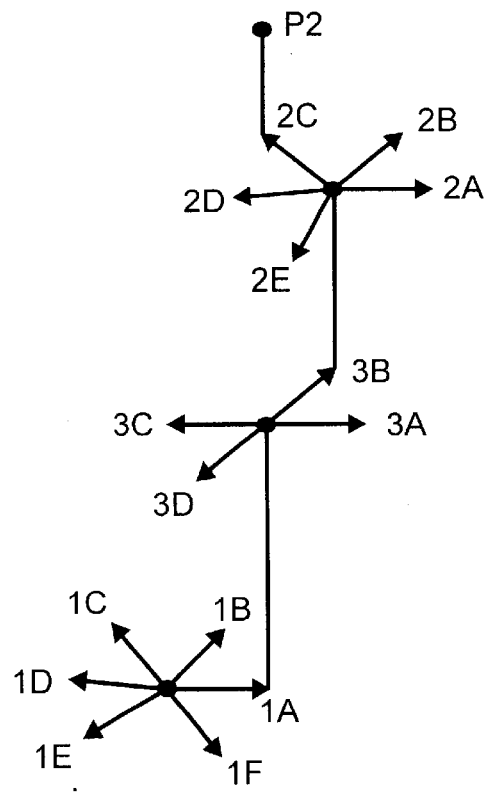

The two different sequence of events of FIGS. 1 and 2 are graphically illustrated in FIGS. 3 and 4. For the purpose of this embodiment it is assumed that for the first selection as to the basic outline of the character, the user is presented with six choices which are graphically illustrated as vectors 1A–1F. The number of parameters available for the second selection in FIG. 1 is five and thus the possible selections are each illustrated graphically as vectors 2A–2E respectively. Finally, the third selection includes four possible parameters which are graphically represented as vectors 3A–3D. From FIG. 3 it is apparent that by following the path 1A, 2C, 3B one arrives at a point P1 which is one point of a 6×5×4=120 point space.

As seen in FIG. 4, the selection carried out in FIG. 2 results in the vectors 1A, 3B, 2C being selected in that order and thereby results in a different point P2 in the 120 point space.

It will be apparent to those skilled in the art that the number of points in such a space rapidly increases with the number of parameters and the number of choices available for each parameter. Furthermore, the nature of the parameters differs. For example one parameter is "Should the interior of the character be filled?" which is essentially a digital parameter having two states either yes or no. Another parameter can be "What colour do you wish to select?" which enables selection of one colour of a large palette of colours. Similarly, the next parameter selected may relate to a property such as opacity, saturation or the like in which case the selected parameter can have a value between 0% and 100% and so on.

The purchaser of a new suite of computer programs dealing with such fonts is, particularly during the initial period following the purchase, faced with an extremely large number of possible choices and wishes to be able to make initial selections rapidly in order to produce output, without unduly wasting time in selecting a particular combination of font parameters from the nearly infinite number made possible by modern computing techniques. Therefore in order to assist the user, the user interface schematically illustrated in FIG. 5 is provided which essentially voids various possible choices on the basis that the computer program vendor knows in advance that some possible choices are unlikely to please most customers.

For example, in relation to FIGS. 1 and 2, the computer vendor may be able to subjectively determine that the sequence illustrated in FIG. 1 will be aesthetically pleasing to most users whilst the sequence illustrated in FIG. 2 is likely not to find favour with users. As a consequence, in order to assist the user the computer program vendor disables point P2 in FIG. 4 and therefore prevents this particular sequence of parameters being selected.

Figure 5:
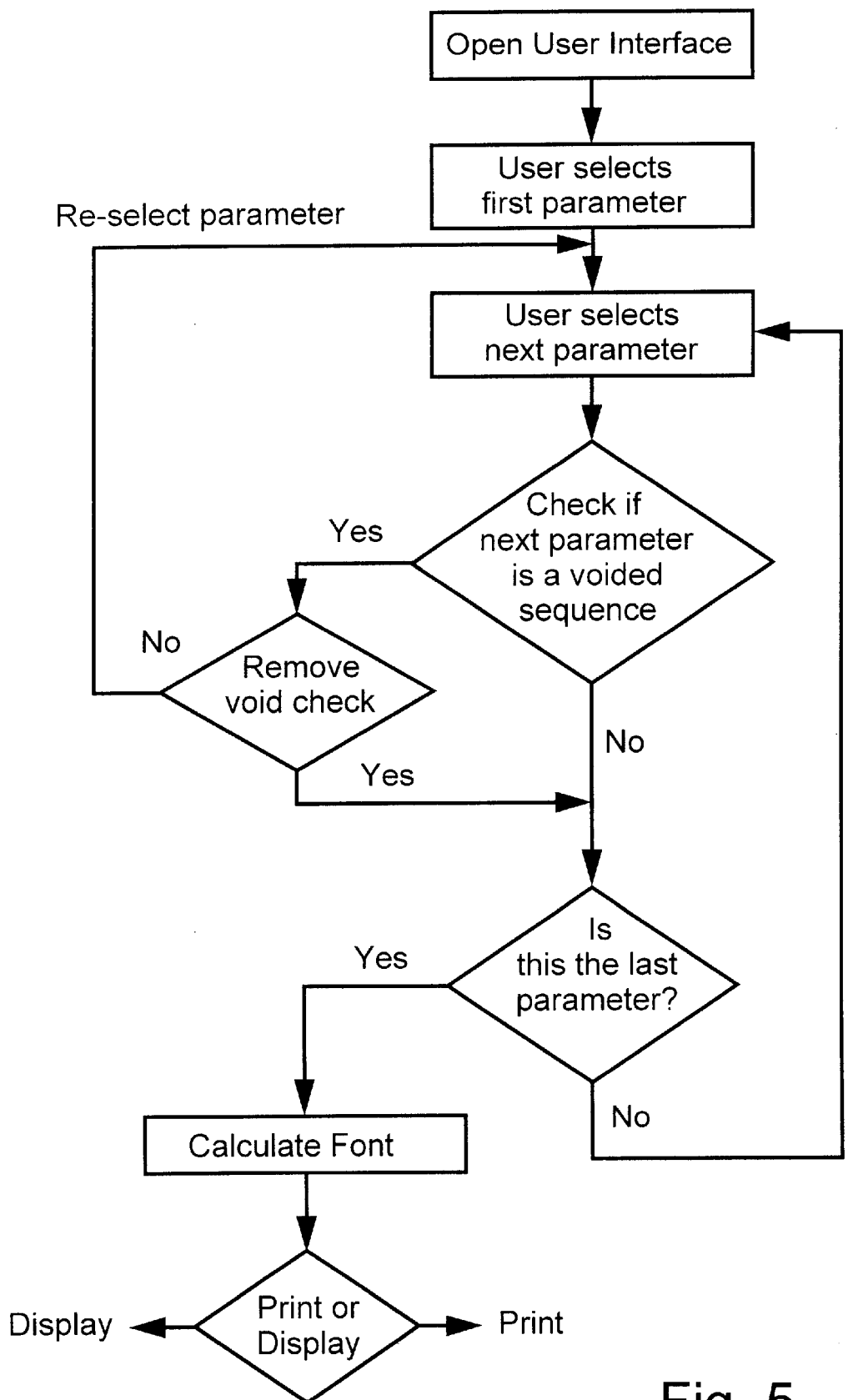
FIG. 5 is a flow chart illustrating the implementation of the user interface.

As seen in FIG. 5, the user selects a first parameter from all the parameters available and then goes on to select the next parameter. If this parameter is part of a sequence of parameters which is not voided, the user is permitted to continue and selects the next parameter in the sequence and so on. However, as soon as the user selects a parameter which lies in one of the voided sequences, the user is asked to reselect the parameter on the basis that the user's selection is heading towards an aesthetically pleasing result. In this way the user is rapidly able to select a sequence of parameters, and then indicate that the last parameter has been selected in which case the computer is then able to calculate the selected font.

Naturally, the purchaser does not wish to be deprived of possible selections and therefore is provided with the option to remove the void check. If this option is selected then all options are able to be selected by the user.

Furthermore, given the perversity of human nature, some users will wish to select fonts which are deliberatively gruesome, alarming, macabre or the like. Therefore in order to cater for such users, the essentially subjective criteria used in determining whether a particular sequence should be voided are preferably able to be selected themselves. In this way users, instead of wasting time avoiding, a macabre font, cannot waste time in selecting fonts which are not macabre.

For the computer supplier, there is a problem as to how to determine which fonts are to be voided. One, time consuming, way is to simply manually examine every possibility and form an entirely subjective judgement as to its fitness (or suitability).

However, it is not necessary to adopt this time consuming procedure. Instead the procedure can be largely automated by use of a genetic algorithm of the general type described, for example, in Sims K. "Artificial Evolution for Computer Graphics" Computer Graphics, Volume 25, Number 4, July 1991.

In utilising such a genetic algorithm the font parameters are equated with "genes" which are then "cross-bred" in order to create various possible combinations of parameters. The best two of these children are "chosen", for example either manually or by means of a fitness function, and bred again. This process quickly and automatically locates combinations with the desired "good" appearance. The automation can be enhanced by estimating the degree or amount of distortion for each child. A suitable fitness function is then to sum the distortion over all generations to arrive at an overall measure for the selected combination of parameters. A large measure of total distortion can be used to eliminate fonts if a "good" appearance is desired (this being equated with small distortions). The reverse applies if fonts of "good" appearance are to be eliminated.

Figure 6:
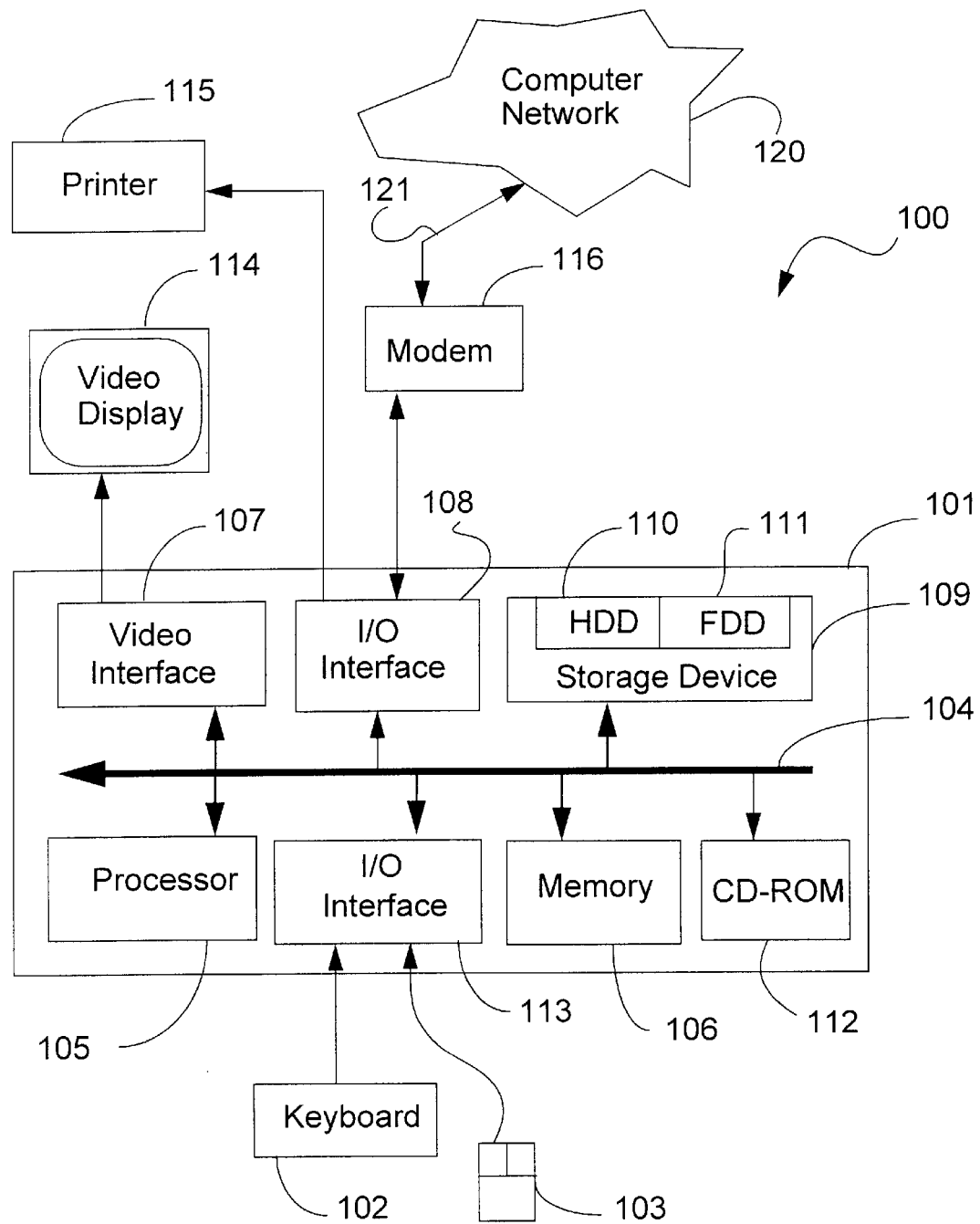
FIG. 6 is a schematic block diagram of a general purpose computer upon which the preferred embodiment of the present invention can be practised.

The method of FIG. 5 is preferably practiced using a conventional general-purpose computer system 100, such as that shown in FIG. 6 wherein the processes of FIG. 5 may be implemented as software, such as an application program executing within the computer system 100. In particular, the steps of the method of FIG. 5 are effected by instructions in the software that are carried out by the computer. The software may be divided into two separate parts; one part for carrying out the FIG. 5 methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for providing a user interface in accordance with the embodiments of the invention. The computer system 100 comprises a computer module 101, input devices such as a keyboard 102 and mouse 103, output devices including a printer 115 and a display device 114. A Modulator-Demodulator (Modem) transceiver device 116 is used by the computer module 101 for communicating to and from a communications network 120, for example connectable via a telephone line 121 or other functional medium. The modem 116 can be used to obtain access to the Internet, and other network systems, such as a Local Area Network (LAN) or a Wide Area Network (WAN).

The computer module 101 typically includes at least one processor unit 105, a memory unit 106, for example formed from semiconductor random access memory (RAM) and read only memory (ROM), input/output (I/O) interfaces including a video interface 107, and an I/O interface 113 for the keyboard 102 and mouse 103 and optionally a joystick (not illustrated), and an interface 108 for the modem 116. A storage device 109 is provided and typically includes a hard disk drive 110 and a floppy disk drive 111 . A magnetic tape drive (not illustrated) may also be used. A CD-ROM drive 112 is typically provided as a non-volatile source of data. The components 105 to 113 of the computer module 101, typically communicate via an interconnected bus 104 and in a manner which results in a conventional mode of operation of the computer system 100 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 110 and read and controlled in its execution by the processor 105. Intermediate storage of the program and any data fetched from the network 120 may be accomplished using the semiconductor memory 106, possibly in concert with the hard disk drive 110. In some instances, the application program may be supplied to the user encoded on a CD-ROM or floppy disk and read via the corresponding drive 112 or 111, or alternatively may be read by the user from the network 120 via the modem device 116. Still further, the software can also be loaded into the computer system 100 from other computer readable medium including magnetic tape, a ROM or integrated circuit, a magneto-optical disk, a radio or infrared transmission channel between the computer module 101 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The method of providing a user interface may alternatively be implemented in dedicated hardware such as one or more integrated circuits performing the functions or sub functions of FIG. 5. Such dedicated hardware may include graphic processors, digital signal processors, or one or more microprocessors and associated memories.

INDUSTRIAL APPLICABILITY

It is apparent from the above that the embodiment(s) of the invention are applicable to the computer graphics industry and to the font generation aspects thereof, in particular.

The foregoing describes only one embodiment of the present invention, and modifications and/or changes can be made thereto without departing from the scope and spirit of the invention, the embodiment being illustrative and not restrictive.

In the context of this specification, the word "comprising" means "including principally but not necessarily solely" or "having" or "including" and not "consisting only of". Variations of the word comprising, such as "comprise" and "comprises" have corresponding meanings.

We claim:

1. A user interface system to allow a user to select font parameters in a selectable font system, said system comprising:

selection means for allowing a user to select a sequence of said font parameters for generation of a font from a plurality of sequences corresponding to a plurality of fonts, wherein said font is uniquely dependent on the font parameters and the order of selection of the font parameters in their corresponding sequence; and disablement means to disable said selection means for predetermined ordered sequences of font parameters.

2. The user interface system as claimed in claim 1, wherein said disablement means is selectively activatable.

3. A user interface system to allow a user to select font parameters in a selectable font system, said system comprising:

selection means for allowing a user to select a sequence of said font parameters for generation of a font from a plurality of sequences corresponding to a plurality of fonts, wherein each font is dependent on the font parameters and the order of the font parameters in their corresponding sequence and there exist at least two sequences having the same font parameters where at least one is allowed for generation and at least another one is not allowed for generation; and disablement means to disable selection of not allowed sequences of said font parameters, wherein said not allowed sequences are determined by a genetic algorithm, with distortion of successive generations of fonts bred by the algorithm being summed to provide a fitness function to determine the not allowed sequences.

4. A method of allowing a user to select font parameters in a selectable font system, said method comprising:

a selecting step, of allowing a user to select a sequence of font parameters for generation of a font from a plurality of sequences corresponding to a plurality of fonts, wherein the font is uniquely dependent on the font parameters and the order of selection of the font parameters in their corresponding sequence;

a determination step, of determining whether the selected sequence of font parameters of a corresponding font is predetermined for generation;

a disable step, of disabling generation of a font based on the selected sequence of font parameters when it is determined in said determining step that the selected sequence of font parameters is a predetermined ordered sequence of the font parameters.

5. The method as claimed in claim 4, further comprising an activation step, of selectively activating said disable step.

6. A method of allowing a user to select font parameters in a selectable font system, said method comprising:

a selecting step, of allowing a user to select a sequence of font parameters for generation of a font from a plurality of sequences corresponding to a plurality of fonts, wherein the font is dependent on the font parameters and the order of the font parameters in their corresponding sequence and there exist at least two sequences having the same font parameters where at least one is allowed for generation and at least another one is not allowed for generation;

a determination step, of determining whether the selected sequence of font parameters of a corresponding font is not allowed for generation; and a disable step, of disabling generation of a font based on the selected sequence of font parameters when it is determined in said determining step that the selected sequence of font parameters is a not allowed sequence, wherein the not allowed sequences are determined using a genetic algorithm, with distortion of successive generations of fonts bred by the algorithm being summed to provide a fitness function to determine the not allowed sequences.

7. A computer program product to allow a user to select font parameters in a selectable font system, said product comprising:

code for a selecting step, of allowing a user to select a sequence of font parameters for generation of a font from a plurality of sequences corresponding to a plurality of fonts, wherein the font is uniquely dependent on the font parameters and the order of selection of the font parameters in their corresponding sequence; and code for a disablement step, of disabling generation of a font when the selected sequence of font parameters is a predetermined ordered sequence of the font parameters.

8. The computer program product as claimed in claim 7, further including code for an activation step, of selectively activating the disablement step.

9. A computer program product to allow a user to select font parameters in a selectable font system, said product comprising:

code for a selecting step, of allowing a user to select a sequence of font parameters for generation of a font from a plurality of sequences corresponding to a plurality of fonts, wherein the font is dependent on the font parameters and the order of the font parameters in their corresponding sequence and there exist at least two sequences having the same font parameters where at least one is allowed for generation and at least another one is not allowed for generation; and code for a disablement step, of disabling generation of a font when the selected sequence of font parameters is a not allowed sequence, wherein the not allowed sequences are determined using a genetic algorithm, the distortion of successive generations of fonts bred by the algorithm being summed to provide a fitness function to determine the not allowed sequences.

10. A font for use in a computer graphical display and/or printing system, parameters of said font being selectable from a plurality of selectable font parameters via a user interface system as claimed in claim 1.

11. A character processing apparatus, comprising:

input means for inputting a current sequence of font parameters for generation of a font from a plurality of sequences corresponding to a plurality of fonts, wherein each font is uniquely dependent on the font parameters and the order of the font parameters in their corresponding sequence;

first checking means for checking as to whether the current sequence of font parameters inputted by said input means is valid or invalid;

second checking means for checking whether said first checking means has been overridden;

re-input means for re-inputting another sequence of font parameters when said first checking means has determined that the current sequence of font parameters is invalid and said second checking means has determined that said first checking means has not been overridden; and character generating means for generating a character based on the current sequence of font parameters when the current sequence of font parameters is valid and for generating a character based on the re-inputted sequence of font parameters when the current sequence of font parameters is invalid, wherein said character generating means generates a font based on the current sequence of font parameters irrespective of whether the current sequence is valid or invalid, if said first checking means has been overridden.

12. A computer-readable medium incorporating a computer program product including a series of instructions for character processing, the instructions comprising:

means for inputting a current sequence of font parameters for generation of a font from a plurality of sequences corresponding to a plurality of fonts, wherein each font is uniquely dependent on the font parameters and the order of the font parameters in their corresponding sequence;

means for checking as to whether the current sequence of font parameters inputted by said input means is valid or invalid;

means for checking whether the means for checking the current sequence has been overridden;

means for re-inputting another sequence of font parameters when the current sequence of font parameters is determined to be invalid and said means for checking the current sequence has not been overridden; and means for generating a character based on the current sequence of font parameters when the current sequence of font parameters is valid and for generating a character based on the re-inputted sequence of font parameters when the current sequence of font parameters is invalid, wherein a font based on the current sequence of font parameters is generated irrespective of whether the current sequence is valid or invalid, if said means for checking the current sequence has been overridden.

13. A method for character generation, said method comprising the steps of:

inputting a current sequence of font parameters for generation of a font from a plurality of sequences corresponding to a plurality of fonts, wherein each font is uniquely dependent on the font parameters and the order of the font parameters in their corresponding sequence;

checking as to whether the current sequence of font parameters inputted in said inputting step is valid or invalid;

checking as to whether the validity of the current sequence has been overridden:

re-inputting another sequence of font parameters when the current sequence of font parameters is invalid and the validity of the current sequence has not been overridden;

generating a character based on the re-inputted sequence of font parameters when the current sequence of font parameters is invalid and the validity of the current sequence has not been overridden; and generating a character based on the current sequence of font parameters when the current sequence of font parameters is valid, wherein a font based on the current sequence of font parameters is generated irrespective of whether the current sequence is valid or invalid if the validity of the current sequence has been overridden.

14. Apparatus to allow a user to select font parameters for generating a font, said apparatus comprising:

selection means for allowing a user to select a sequence of said font parameters from a set of possible sequences of said font parameters for generation of a font, wherein the font is uniquely dependent on the font parameters and the order of selection of the font parameters in their corresponding sequence;

check means for checking whether the selected sequence of font parameters belongs to a predetermined subset of the set, wherein the predetermined subset comprises predetermined ordered sequences of the font parameters; and generating means for generating, if said check means determines the selected sequence does not belong to the predetermined subset, a font based on the selected sequence of parameters.

15. Apparatus to allow a user to select font parameters for generating a font, said apparatus comprising:

first selection means for allowing a user to select a sequence of the font parameters from a set of possible sequences of the font parameters for generation of a font, wherein each font is dependent on the font parameters and the order of the font parameters in their corresponding sequence;

first check means for checking whether the selected sequence of font parameters belongs to a predetermined subset of the set, wherein the predetermined subset comprises non-allowed sequences of font parameters;

generating means for generating, if said first check means determines the selected sequence does not belong to the predetermined subset, a font based on the selected sequence of parameters;

second check means for checking whether an override has been activated; and deactivating means for deactivating the first check means, if said override has been activated, wherein said generating means generates a font based on the selected sequences of parameters irrespective of whether the selected sequence belongs to the predetermined subset, if said override has been activated.

16. A method of allowing a user to select font parameters for generating a font, said method comprising:
- a selecting step, for allowing a user to select a sequence of said font parameters from a set of possible sequences of said font parameters for generation of a font, wherein the font is uniquely dependent on the font parameters and the order of selection of the font parameters in their corresponding sequence;
- a check step, of checking whether the selected sequence of font parameters belongs to a predetermined subset of the set, wherein the predetermined subset comprises predetermined ordered sequences of the font parameters; and
- a generating step, of generating, if it is determined in said check step that the selected sequence does not belong to the predetermined subset, a font based on the selected sequence of parameters.

17. A method of allowing a user to select font parameters for generating a font, said method comprising:
- a first selecting step, for allowing a user to select a sequence of said font parameters from a set of possible sequences of said font parameters for generation of a font, wherein each font is dependent on the font parameters and the order of the font parameters in their corresponding sequence;
- a first check step, of checking whether said selected sequence of font parameters belongs to a predetermined subset of said set, wherein said predetermined subset comprises non-allowed sequences of font parameters;
- a generating step, of generating, if said first check step determines the selected sequence does not belong to said predetermined subset, a font based on said selected sequence of parameters; and
- a second check step, of checking whether an override has been activated;
- a deactivating step, of deactivating the first check step, if said override has been activated, wherein said generating step includes generating a font based on the selected sequences of parameters irrespective of whether the selected sequence belongs to the predetermined subset, if said override has been activated.

18. A computer program product to allow a user to select font parameters for generating a font, said product comprising:
- selection means for allowing a user to select a sequence of said font parameters from a set of possible sequences of said font parameters for generation of a font, wherein said font is uniquely dependent on the font parameters and the order of selection of the font parameters in their corresponding sequence;
- check means for checking whether said selected sequence of font parameters belongs to a predetermined subset of said set, wherein said predetermined subset comprises predetermined ordered sequences of said font parameters; and
- generating means for generating, if said check means determines the selected sequence does not belong to said predetermined subset, a font based on said selected sequence of parameters.

19. A computer program product to allow a user to select font parameters for generating a font, said product comprising:
- first selection means for allowing a user to select a sequence of said font parameters from a set of possible sequences of said font parameters for generation of a font, wherein each font is dependent on the font parameters and the order of the font parameters in their corresponding sequence;
- first check means for checking whether said selected sequence of font parameters belongs to a predetermined subset of said set, wherein said predetermined subset comprises non-allowed sequences of font parameters; and
- generating means for generating, if said first check means determines the selected sequence does not belong to said predetermined subset, a font based on said selected sequence of parameters; and
- second check means for checking whether an override has been activated; and
- deactivating means for deactivating the first check means, if said override has been activated,
- wherein said generating means generates a font based on the selected sequences of parameter, irrespective of whether the selected sequence belongs to the predetermined subset, if said override has been activated.

20. Apparatus for generating a font comprising a sequence of font parameters from a set of possible sequences of font parameters, where each font is uniquely dependent on the font parameters and the order of the font parameters in their corresponding sequence, wherein said apparatus comprises:
- a first selection means for selecting a font parameter as an initial font parameter of a current sequence of font parameters;
- a second selection means for selecting another font parameter, and appending the selected font parameter to the current sequence of font parameters;
- a first determination means for determining whether the current sequence of font parameters belongs to a predetermined subset of a set of sequences of font parameters, wherein said predetermined subset comprises non-allowed sequences of font parameters;
- a second determination means for determining if an override is activated:
- a third selection means for selecting another font parameter when said first determination means has determined that the current sequence of font parameters belongs to said predetermined subset and said second determination means determines that said override is deactivated, wherein the last appended font parameter in the current sequence is replaced with the currently selected font parameter;
- a third determination means for determining whether the current sequence of parameters is complete when said first determination means has determined that the current sequence of font parameters does not belong to said predetermined subset;
- a generation means for generating a font based on the current sequence of parameters when said third determination means has determined the current sequence of font parameters is complete, wherein the current sequence of font parameters includes font parameters belonging to said predetermined subset if said second determination means determines that said override is activated; and
- a repetition means for repeating the operations of the second selection, first determination, second determination, third selection, third determination and generation when said third determination means has determined the current sequence of font parameters is not complete.

21. A computer program product for generating a font comprising a sequence of font parameters from a set of possible of sequences of font parameters, where each font is uniquely dependent on the font parameters and the order of the font parameters in their corresponding sequence, wherein said computer product comprises:
- a first selection means for selecting a font parameter as an initial font parameter of a current sequence of font parameters;
- a second selection means for selecting another font parameter, and appending the selected font parameter to the current sequence of font parameters;
- a first determination means for determining whether the current sequence of font parameters belongs to a predetermined subset of a set of sequences of font parameters, wherein said predetermined subset comprises non-allowed sequences of font parameters;
- a second determination means for determining if an override is activated;
- a third selection means for selecting another font parameter when said first determination means has determined that the current sequence of font parameters belongs to said predetermined subset and said second determination means determines that said override is deactivated, wherein the last appended font parameter in the current sequence is replaced with the currently selected font parameter;
- a third determination means for determining whether the current sequence of parameters is complete when said first determination means has determined that the current sequence of font parameters does not belong to said predetermined subset;
- a generation means for generating a font based on the current sequence of parameters when said third determination means has determined the current sequence of font parameters is complete, wherein the current sequence of font parameters includes font parameters belonging to said predetermined subset if said second determination means determines that said override is activated; and
- a repetition means for repeating the operations of the second selection, first determination, second determination, third selection, third determination and generation when said third determination means has determined the current sequence of font parameters is not complete.

22. A method for generating a font comprising a sequence of font parameters from a set of possible of sequences of font parameters, where each font is uniquely dependent on the font parameters and the order of the font parameters in their corresponding sequence, said method comprising the steps of:
- (1) selecting a font parameter as an initial font parameter of a current sequence of font parameters;
- (2) selecting another font parameter, and appending the selected font parameter to the current sequence of font parameters;
- (3) checking whether the current sequence of font parameters belongs to a predetermined subset of a set of sequences of font parameters and whether an override is activated, wherein said predetermined subset comprises non-allowed sequences of font parameters; and if so performing step (5), otherwise performing step (4);
- (4) selecting another font parameter, and replacing the last appended font parameter in the current sequence with the currently selected font parameter;
- (5) checking whether the current sequence of parameters is complete; and if so performing step (6), otherwise performing step (7);
- (6) generating a font based on the current sequence of parameters, wherein the current sequence of font parameters includes font parameters belonging to said predetermined subset if said override is activated; and
- (7) repeating steps (2) to (6).

23. The user interface system as claimed in claim 1, wherein there exist at least two sequences having the same font parameters where at least one is allowed for generation and at least another one is not allowed for generation, and said disablement means disables selection of said not allowed sequences of said font parameters.

24. The method as claimed in claim 4, wherein there exist at least two sequences having the same font parameters where at least one is allowed for generation and at least another one is not allowed for generation, and said disablement means disables selection of said not allowed sequences of said font parameters.

25. The computer program product as claimed in claim 7, wherein there exist at least two sequences having the same font parameters where at least one is allowed for generation and at least another one is not allowed for generation, and said disablement means disables selection of said not allowed sequences of said font parameters.

* * * * *